Figure 7:
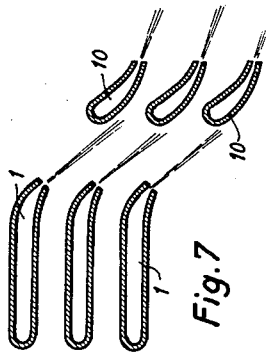

April 17, 1962  M. P. LE NABOUR ET AL  3,030,005
EJECTORS OR JET APPARATUS
Filed Jan. 19, 1959  3 Sheets-Sheet 1
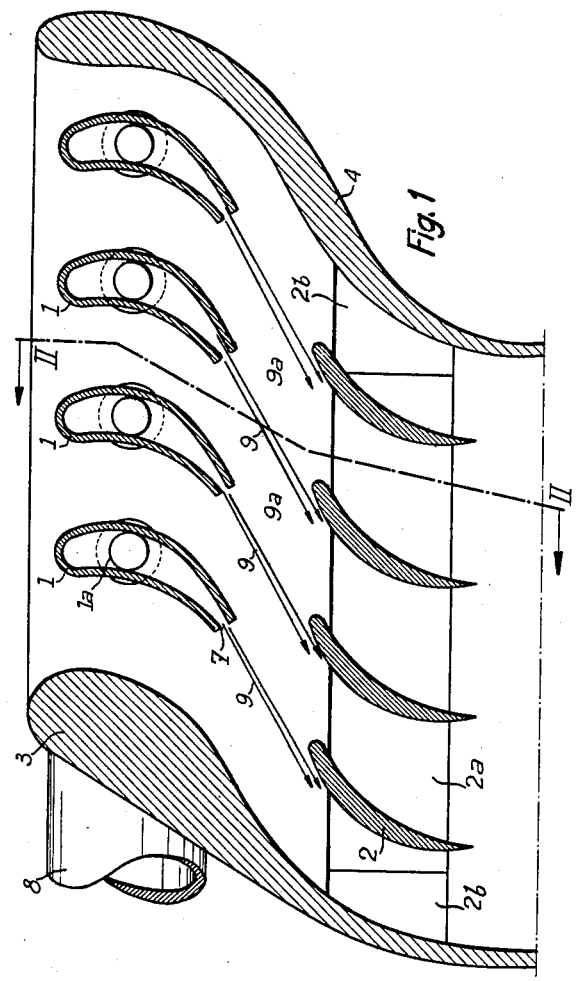

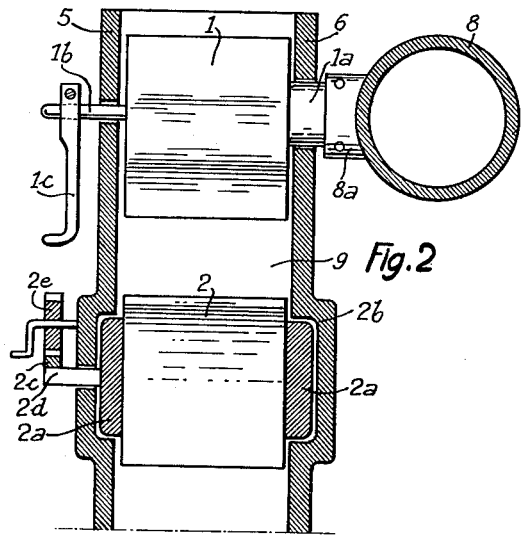
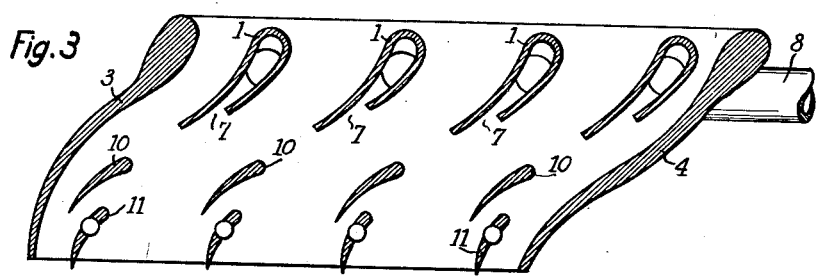
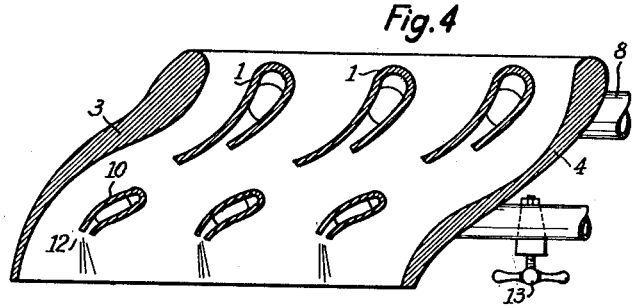

April 17, 1962 M. P. LE NABOUR ET AL 3,030,005
EJECTORS OR JET APPARATUS
Filed Jan. 19, 1959 3 Sheets-Sheet 3

3,030,005
EJECTORS OR JET APPARATUS
Marcel P. Le Nabour, Montreuil-sous-Bois, and Jean H. Bertin, Neuilly-sur-Seine, France, assignors to Societe Bertin & Cie, Paris, France, a company of France
Filed Jan. 19, 1959, Ser. No. 787,727
Claims priority, application France Jan. 21, 1958
4 Claims. (Cl. 230—95)

The ejectors or jet apparatus conventionally used in the technical world comprise, as is known, the following:

(a) A convergent inlet for imparting speed to an induced flow, (b) A device for ejecting an inducing flow, in the vicinity of the maximum speed of the induced flow and in accordance with the mean direction of the latter, (c) A mixing zone whose cross-section approximates to that of the throat of the convergent portion so as to equalize the specific energies of the two flows, (d) A divergent outlet or diffuser, recovering the kinetic energy of the mixed flow so as to transform it into pressure energy.

One aspect of the invention concerns the manner of effecting the necessary variations in cross-section and uses for this purpose the properties of grids formed of vanes, similar to those used for example in gas turbines or steam turbines. It is known in fact that grid arrangements of appropriately curved vanes produce convergent or divergent flows and it is therefore possible, according to the invention, to shape the vanes so as to obtain, in the direction of flow of the fluid, the various gradients in cross-section which the ejector is to have.

A further aspect consists in arranging the nozzle or nozzles provided for ejecting the inducing flow in such a manner that they furnish one or more jets having the form of a thin veil.

This second aspect can be advantageously combined with the first, using hollow vanes provided with a nozzle in the form of a slot and having their internal cavites supplied with inducing fluid under pressure.

The invention will now be described with reference to the accompanying drawings, which are given by way of non-limitative example, any feature brought out either from the text or from the figures being understood to come within the scope of the present invention.

Figure 5:
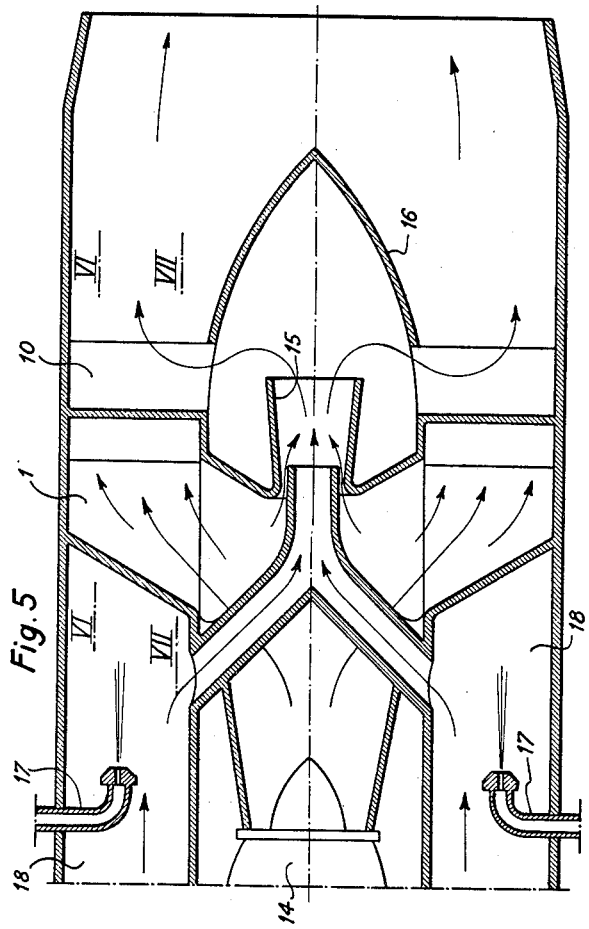
Figure 6:
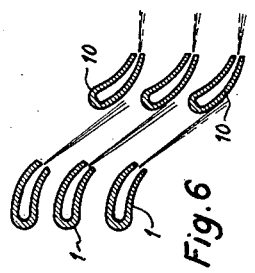

In the drawings:

FIG. 1 shows a first embodiment of the invention seen in a section taken through a plane perpendicular to the generatrices of the vanes, FIG. 2 shows this same embodiment as seen in section through a plane perpendicular to that of FIG. 1, along the line II—II, FIGS. 3 and 4 are views similar to FIG. 1 of two other embodiments, FIG. 5 is an axial sectional view of the rear portion of a reaction propulsion unit provided with an ejector apparatus according to the invention, and FIGS. 6 and 7 are sectional views of FIG. 5 on coaxial cylinders whose generatrices are VI—VI and VII—VII, the sections being developed in a single plane.

The ejector apparatus which is illustrated in FIGS. 1 and 2 comprises a duct delimited by two profiled walls 3, 4 and by two plane parallel walls 5, 6, so that in this example the horizontal sections of this duct have a rectangular shape (although the walls 5 and 6 may be profiled, for example, in a convergent-divergent form so as to promote the diffusion and ejector effect). Within this duct are situated two grids comprising vanes 1, 2, arranged one behind the other. These vanes are fixed, but their inclination can be adjustable as will be explained hereinafter. The vanes of the first grid are hollow and provided along their trailing edge with a nozzle in the form of a slot 7. The internal cavity of each of these vanes is connected by a hollow pivot $1a$ to a manifold 8 communicating with the source of inducing flow. The latter flow therefore escapes through the nozzles 7 at the trailing edges, forming thin planar veils 9 which entrain the induced flow penetrating through the upper orifice of the duct and travelling in a downward direction therein. In the course of this travel, the induced flow is made to undergo changes in direction, and therefore changes in cross-section imposed by each of the vane grids.

The inducing jets could equally well be independent of the systems of vanes, for example they could be discharged from nozzles carried on the walls 5 and 6, but it is more advantageous to use the vanes of the upstream grid to form ejection nozzles since in this way there is no need to provide special nozzles which may hinder the passage of the induced flow and the cross-section of each vane is sufficient to admit a very considerable inducing flow.

One of the advantages of these ejector devices is that they are suitable for being adjusted so as to have variable characteristics.

Adjustment of the angle of deviation of the induced flow entails a concomitant variation in the ratio of convergence of the diffuser, which makes it possible to modify the characteristics of the ejector in dependence on, for example, the speed of the inducing flow. For this, it is possible to mount the vanes to be pivotable such as is shown by way of example in FIGS. 1 and 2. The hollow pivot $1a$ of each of the vanes of the upstream grid extends through the wall 6 in such a manner that it can rotate in this wall, and is also rotatable in a hollow boss $8a$ of the manifold 8. At the opposite side, the vane comprises a pivot $1b$ extending through the wall 5 and carrying a crank $1c$. The handles of these cranks are connected by a rod, which is not shown in the drawings, whereby the angles of inclination of all the vanes 1 of the grid can be varied simultaneously. The possibility of adjusting the inlet vanes 1 may be sufficient in many cases, owing to the presence of the mixing space $9a$ between the upstream vanes 1 and downstream vanes 2. Naturally, it is also possible to mount the vanes 2 to be pivotable so as to allow their inclination to be varied.

In the case where the angle of deviation of the induced flow is fairly considerable, it is possible advantageously to arrange the correcting or downstream vanes 2 relatively to the inducing jets 1 in such a manner that the latter impinge on to the outer curve of the vanes 2, as illustrated in FIG. 1. A compromise will have to be reached between the length of the mixing zone $9a$ which guarantees uniform distribution, and the effectiveness of the overspeed of the outer curve of the vanes 2, ensuring correct functioning of the diffuser.

In order to obtain the best relative positions for the two groups of vanes, one of them can be adjustable by transverse sliding as illustrated, for example, at the downstream vanes 2 in FIGS. 1 and 2. This is particularly advantageous in cases where the delivery pressure of the ejector varies within wide limits, since in this case the deviation of the flows in the mixing zone $9a$ could undergo considerable variations. In the embodiment of the drawings, the vanes 2 are fixed on two parallel bands $2a$ which can slide in grooves $2b$ formed on the walls 5, 6. The sliding movement of the grid of vanes thus constituted is controlled by a rack $2c$, mounted on pins $2d$ which are fixed individually on one of the plates $2a$ and extend through a slot in the wall 5. A toothed wheel $2e$ is used for displacing this rack.

An ejector device intended for operation with fairly constant characteristics can have all its elements fixed in position.

FIG. 3 illustrates an ejector similar to the preceding one but intended for supporting an aircraft by reaction of the downwardly directed mixed flow which therefore issues directly into the atmosphere.

This ejector comprises various features which are not limited to this application.

The injection nozzles 7 for the inducing jets are carried as in FIGS. 1 and 2 by the inlet vanes 1 but, in this example, open on to the outer curve of the latter upstream of the trailing edge, which results in more symmetrical entrainment of the induced flow which is almost simultaneously at both sides in contact with the inducing flow, and also lightens the vanes somewhat and simplifies their manufacture.

The diffuser comprises two stages, formed of two separate grids of vanes 10 and 11 situated in such a manner with respect to one another as to have the effect of a slot system. This makes it readily possible to go beyond a deviation angle of 60°, which corresponds to a cross-sectional ratio equal to 2 for the diffuser, avoiding having the flow detached from the walls of this diffuser. A cross-sectional ratio greater than 2 is in fact necessary for obtaining good efficiency with a high-speed inducing flow such as may be furnished by a gas turbine of the type used in aviation.

In the application indicated hereinbefore, namely the support of an aircraft, it is very advantageous to make the vanes of the last stage 11 of the diffuser variable. In fact, this makes it possible to reduce the deviation at will, that is to say to retain a certain angle of inclination in the mixed flow at the outlet, which produces a propulsive action with, moreover, even a gain in the supporting action, on the one hand owing to the reaction of the atmosphere and on the other hand by increasing the efficiency of the diffuser due to the reduction in the deviation which the latter has to effect.

This effect could be further improved by blowing from the trailing edge of the first grid of vanes 10 of the diffuser by means of slots formed in the said vanes 10 and supplied through the interior of the said vanes, in order to improve the interaction of the two grids of vanes 10 and 11 irrespective of the orientation of the vanes 11.

In the variant represented in FIG. 4, the grid of mobile vanes 11 is replaced by blowing from slots 12 in hollow vanes 10, this blowing being so directed that when it is in action it causes the maximum deviation, the minimum being obtained without blowing, all the intermediate values being possible by regulating the blowing action by means of an adjusting valve 13 provided in the collector supplying the internal cavities of the vanes 10.

A blowing arrangement of this kind is also advantageous for other purposes than adjustment, as will be explained hereinafter.

The blowing fluid for the vanes of the diffuser could be taken directly from the flow of inducing fluid of the ejector, but since this fluid is generally at a high pressure it would require the construction of very narrow slots of about one-twentieth of the induction slots provided on the vanes 1. It is therfore more advantageous to supply the vanes of the diffuser with fluid at a lower pressure. For this low-pressure source, it is possible to use an auxiliary ejector using a small proportion of the main inducing flow as driving fluid, which permits both the use of wider slots and a slight increase in the impulsion force available.

FIGS. 5, 6 and 7 illustrate an ejector intended for the propulsion of a vehicle by reaction of the ambient fluid (an aircraft in air or a ship in water) or any other applications, for example a pump or a fan. This ejector uses more particularly an auxiliary ejector for blowing at the diffuser, as described hereinbefore.

The chief inducing flow issues from a pressure-fluid generator 14 situated at the left of FIG. 5. This is, for example, a gas turbine of an aircraft, whose discharge flow is utilized. The main portion of this flow is sent through the upstream vanes 1 having an annular disposition, these vanes carrying the slots for inducing the induced flow, the latter circulating through an annular space.

A small portion is introduced into the auxiliary ejector 15 which creates in the cavity 16 a slight over-pressure sufficient to supply the internal cavity of the hollow vanes 10 and the slots or auxiliary blowing holes formed in the latter.

FIGS. 6 and 7 illustrate an evolution of the cross-section of the upstream vanes 1, which gives them a triangular form in FIG. 5. At the base of the vanes, where all the gases have to pass at a low speed, the configuration can be elongated axially (FIG. 7) without losing too much by friction on the induced fluid, the latter being not yet accelerated.

The width of the slots can also vary along the vanes, to take into account the radial arrangement of the latter.

Instead of the exhaust gases of a gas turbine assembly, it is possible to use as the driving fluid for supplying the nozzles of the upstream grid 1, cold air taken from the outlet of the compressor of the said assembly and to use the discharge fluid from the turbine, which is at a lower pressure, for supplying the blowing arrangements of the diffuser. In this case the auxiliary ejector 15 of FIG. 5 is redundant.

Irrespective of the constructional form chosen, the adaptations of this apparatus to various uses are relatively simple, since it is possible to provide an arrangement ensuring two kinds of freedom of movement for the diffuser 10 relative to the inducing means 1 (for example, rotation so as to have better distribution of speed at impingement against the vanes 10, and axial translational movement for adjusting the length of the mixing zone.

The reactive energy can be augmented in cases where the induced flow is air, by combustion at the outlet of the ejector. In order to effect this combustion, it is possible to inject the fuel into the diffuser or better still upstream of the ejector 15 by means of injectors such as 17 (FIG. 5). The flame produced will be very divided and of excellent stability, in view of the considerable number of independent wakes caused by the vanes. The flame will not move back upstream of the vanes 10, owing to the overspeed in the mixing zone.

Finally, it is possible to have very low dilution values, that is to say it is possible to use small flows of induced fluid whilst giving them a great increase in pressure, by diminishing the pitch of the vanes. The same result can also be obtained by arranging in the path of travel of the same induced flow various ejector devices, arranged one downstream of the other. In this case, moreover, each device can be supplied by an independent source of inducing fluid or a source of inducing fluid at a different pressure.

What we claim is:

1. An ejector device comprising, in combination, a conduit for the flow of an induced fluid, a first set of deflecting guide vanes disposed in said conduit in spaced relationship to each other and having concave and convex opposite surfaces defining therebetween curved converging first passages for the flow of said induced fluid, means cooperating with the trailing edges of said guide vanes for injecting motive fluid in a direction substantially tangential to said vanes at said trailing edges, and a second set of deflecting guide vanes disposed downstream of said first set and having convex and concave opposite surfaces defining therebetween second passages which are oppositely curved with respect to said first passages, whereby the deflected flow of fluid issuing from said first passages defined by said first set of vanes is straightened out by said second set of vanes in passing through said second passages.

2. An ejector device comprising, in combination, a conduit for the flow of an induced fluid, a first set of deflecting guide vanes disposed in said conduit in spaced relationship to each other and having concave and convex opposite surfaces defining therebetween curved converging first passages for the flow of said induced fluid, and means cooperating with the trailing edges of said vanes for injecting motive fluid in a direction substantially tangential to said vanes at said trailing edges, the vanes of said first set being hollow and defining an inner recess communicating with said motive fluid injecting means, said recess being adapted to be supplied with motive fluid under pressure, and a second set of deflecting guide vanes disposed downstream of said first set and having convex and concave opposite surfaces defining therebetween second passages which are oppositely curved with respect to said first passages, whereby the deflected flow of fluid issuing from said first passages defined by said first set of vanes is straightened out by said second set of vanes in passing through said second passages.

3. An ejector device comprising, in combination, a conduit for the flow of an induced fluid, a first set of deflecting guide vanes disposed in said conduit in spaced relationship to each other and having concave and convex opposite surfaces defining therebetween curved converging first passages for the flow of said induced fluid, said vanes being hollow, and nozzles in the form of slots extending along the trailing edges of said vanes for injecting motive fluid as a thin laminar jet in a direction substantially tangential to said vanes at said trailing edges, and a second set of deflecting guide vanes disposed downstream of said first set and having convex and concave opposite surfaces defining therebetween second passages which are oppositely curved with respect to said first passages, whereby the deflected flow of fluid issuing from said first passages defined by said first set of vanes is straightened out by said second set of vanes in passing through said second passages.

4. An ejector device comprising, in combination, a conduit for the flow of an induced fluid, a first set of deflecting guide vanes disposed in said conduit in spaced relationship to each other and having concave and convex opposite surfaces defining therebetween curved converging first passages for the flow of an induced fluid, said vanes being hollow, and nozzles in the form of slots extending along the trailing edges of said vanes for injecting motive fluid as a thin laminar jet in a direction substantially tangential to said vanes at said trailing edges, and a second set of deflecting guide vanes disposed downstream of said first set and having convex and concave opposite surfaces defining therebetween second passages which are oppositely curved with respect to said first passages, whereby the deflected flow of fluid issuing from said first passages defined by said first set of vanes is straightened out by said second set of vanes in passing through said second passsages, said nozzles being directed in planes which are substantially tangential to said convex surfaces of the vanes of said second set.

References Cited in the file of this patent

UNITED STATES PATENTS

| | | |
|---|---|---|
| 1,612,838 | Schutz | Jan. 4, 1927 |
| 2,648,192 | Lee | Aug. 11, 1953 |
| 2,709,893 | Birmann | June 7, 1955 |

FOREIGN PATENTS

| | | |
|---|---|---|
| 136,472 | Switzerland | Nov. 15, 1929 |
| 463,688 | Canada | June 6, 1945 |
| 552,391 | Great Britain | Apr. 6, 1943 |